Figure 1:
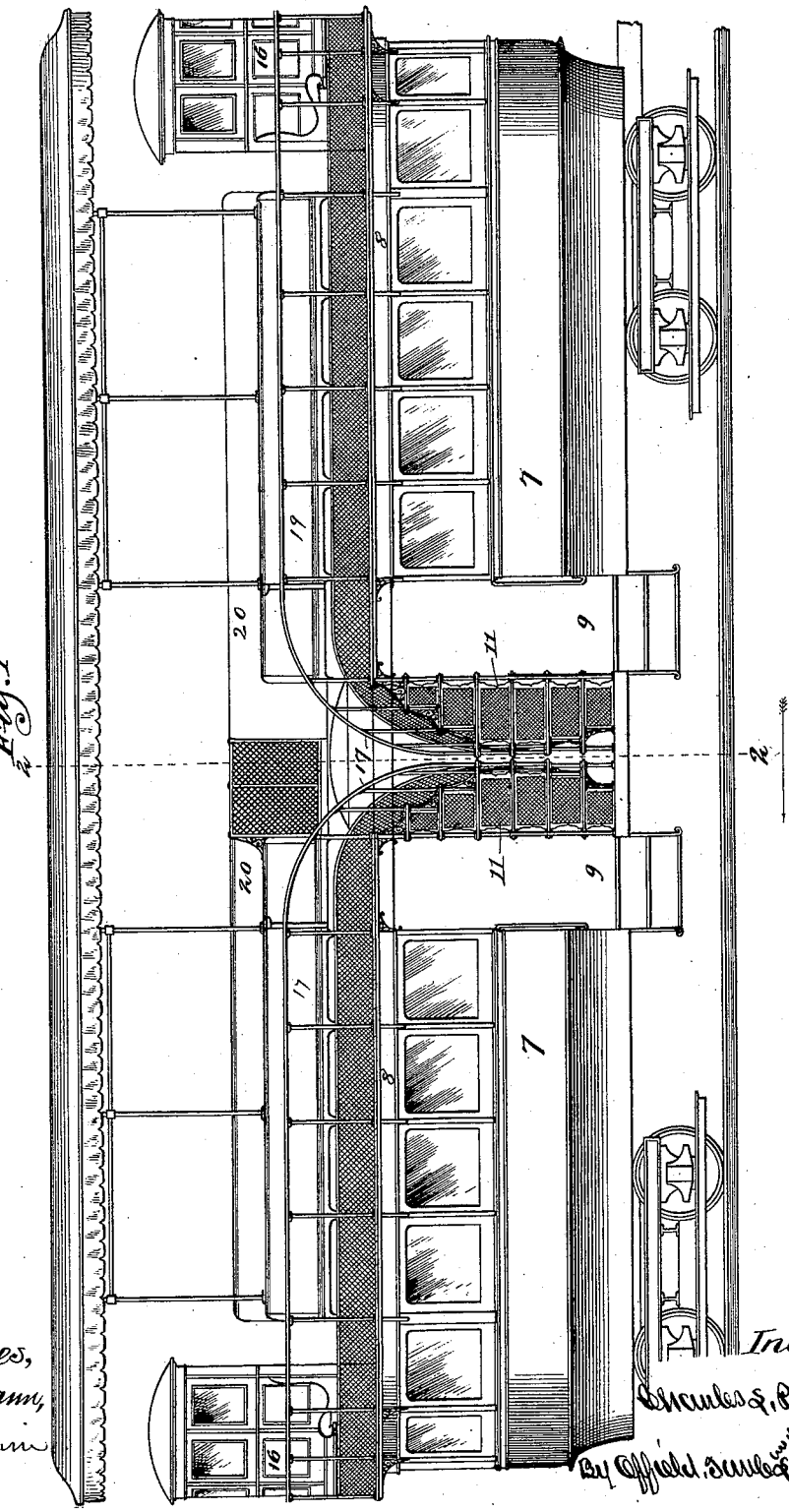

(No Model.)
10 Sheets—Sheet 1.

C. L. PULLMAN.
PASSENGER CAR.

No. 471,761. Patented Mar. 29, 1892.

(No Model.)

C. L. PULLMAN.
PASSENGER CAR.

No. 471,761.

10 Sheets—Sheet 2.

Patented Mar. 29, 1892.

(No Model.)

10 Sheets—Sheet 3.

C. L. PULLMAN.
PASSENGER CAR.

No. 471,761.

Patented Mar. 29, 1892.

(No Model.) 10 Sheets—Sheet 4.
C. L. PULLMAN.
PASSENGER CAR.

No. 471,761. Patented Mar. 29, 1892.

Witnesses, Inventor,
Charles L. Pullman
By Offield, Towle & Linthicum,
Att'ys.

(No Model.) 10 Sheets—Sheet 5.
C. L. PULLMAN.
PASSENGER CAR.
No. 471,761. Patented Mar. 29, 1892.
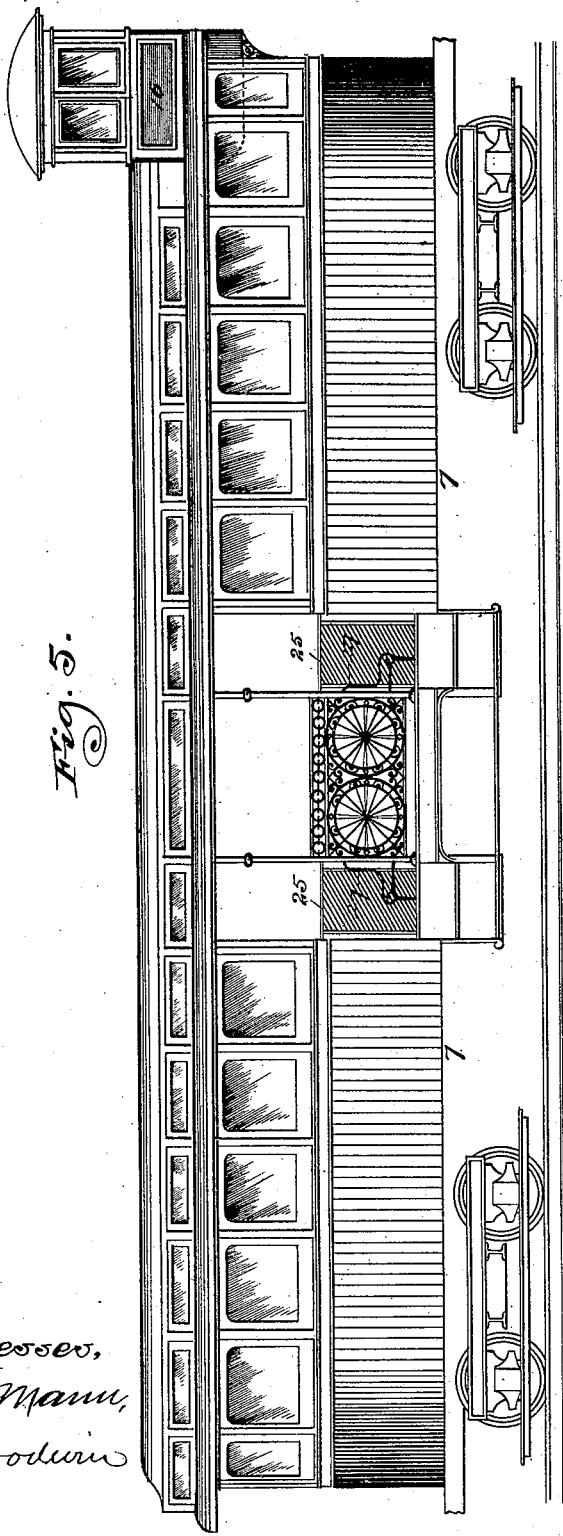

(No Model.)
C. L. PULLMAN.
PASSENGER CAR.
No. 471,761. Patented Mar. 29, 1892.
10 Sheets—Sheet 6.
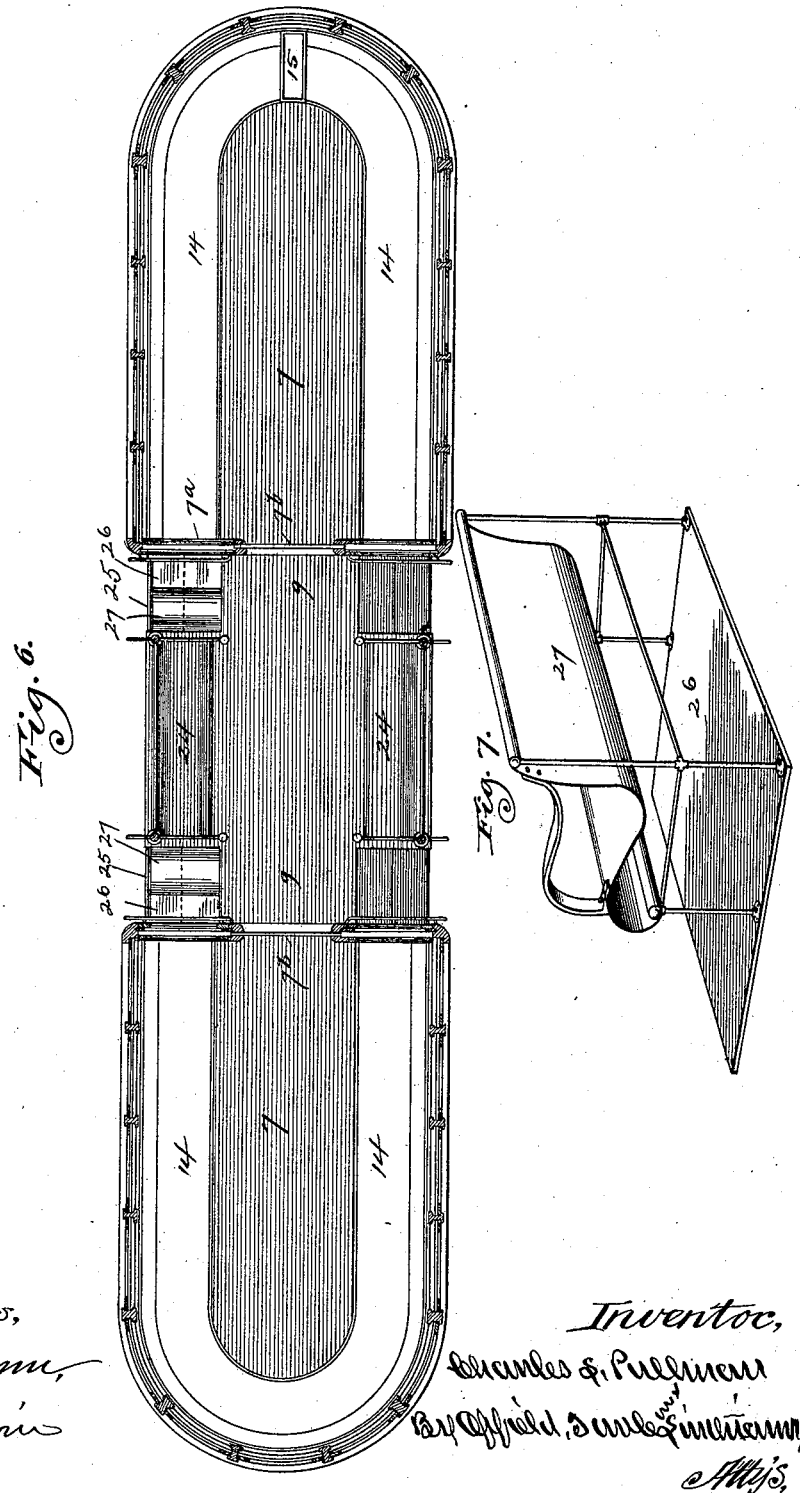
Witnesses,
Inventor,

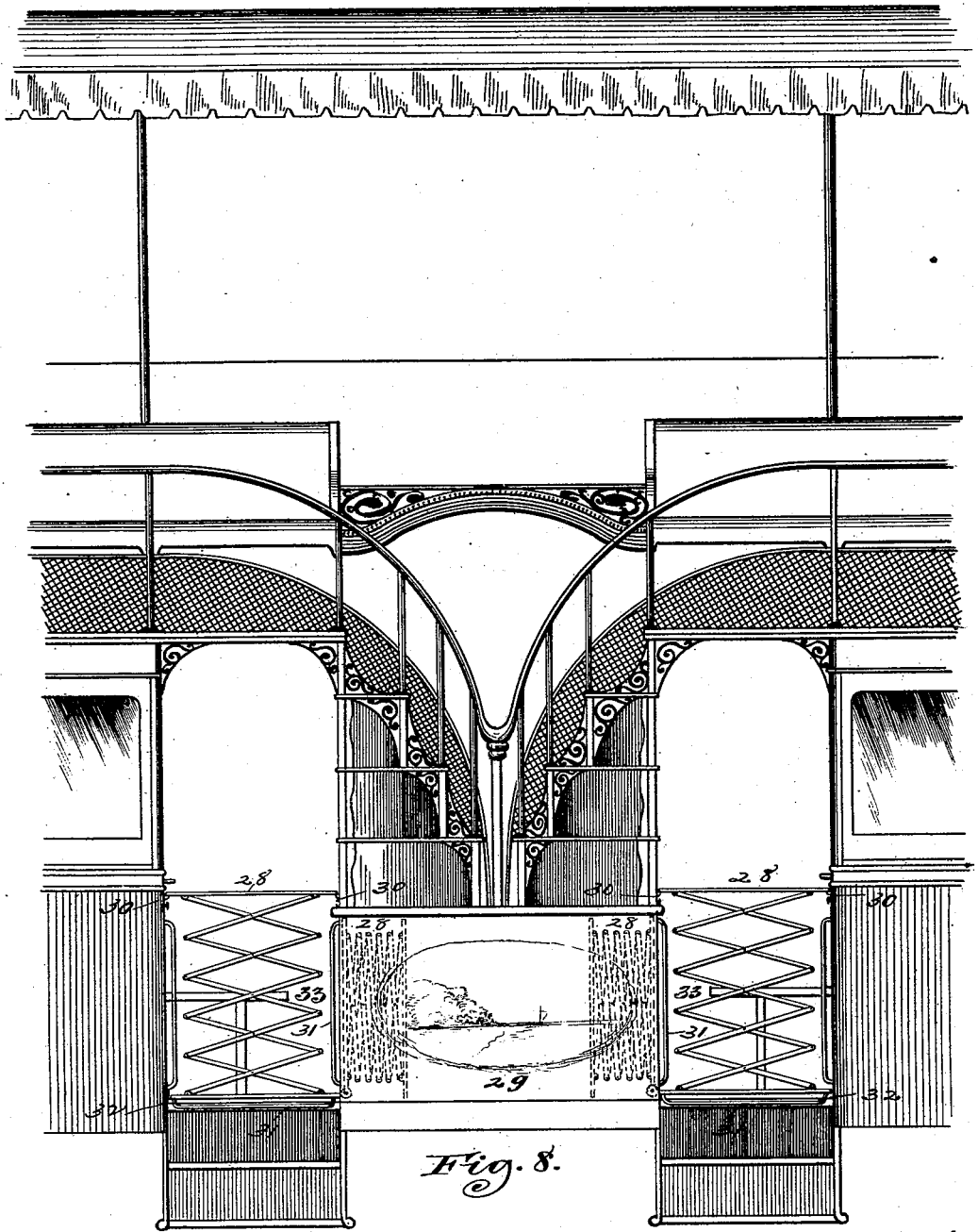

(No Model.) 10 Sheets—Sheet 8.
C. L. PULLMAN.
PASSENGER CAR.
No. 471,761. Patented Mar. 29, 1892.
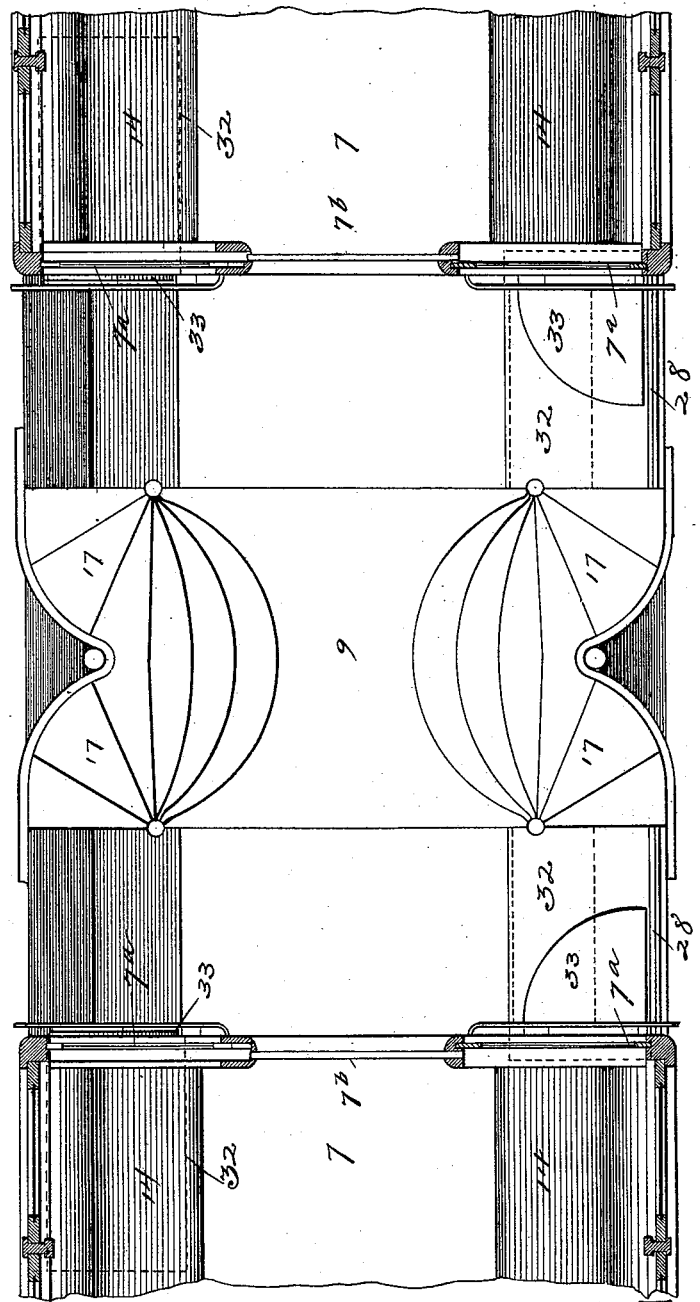

(No Model.)
10 Sheets—Sheet 9.
C. L. PULLMAN.
PASSENGER CAR.
No. 471,761. Patented Mar. 29, 1892.
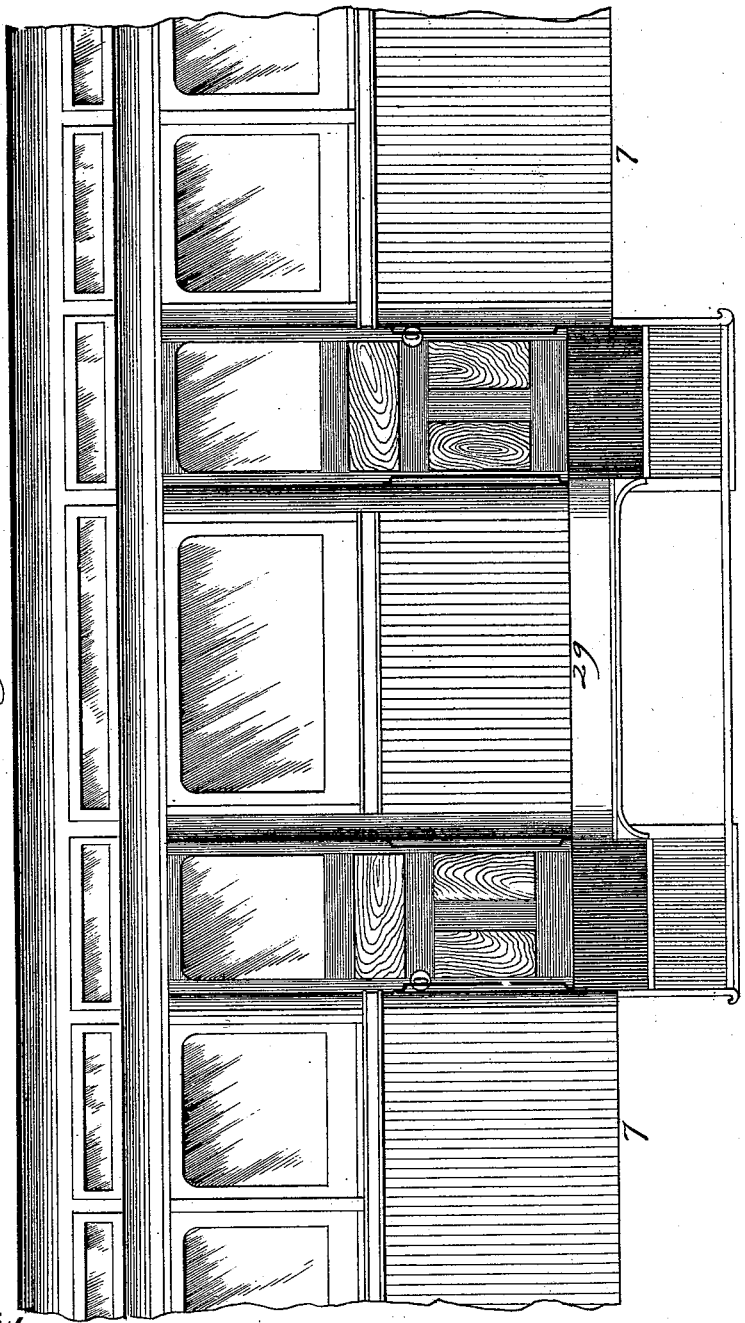

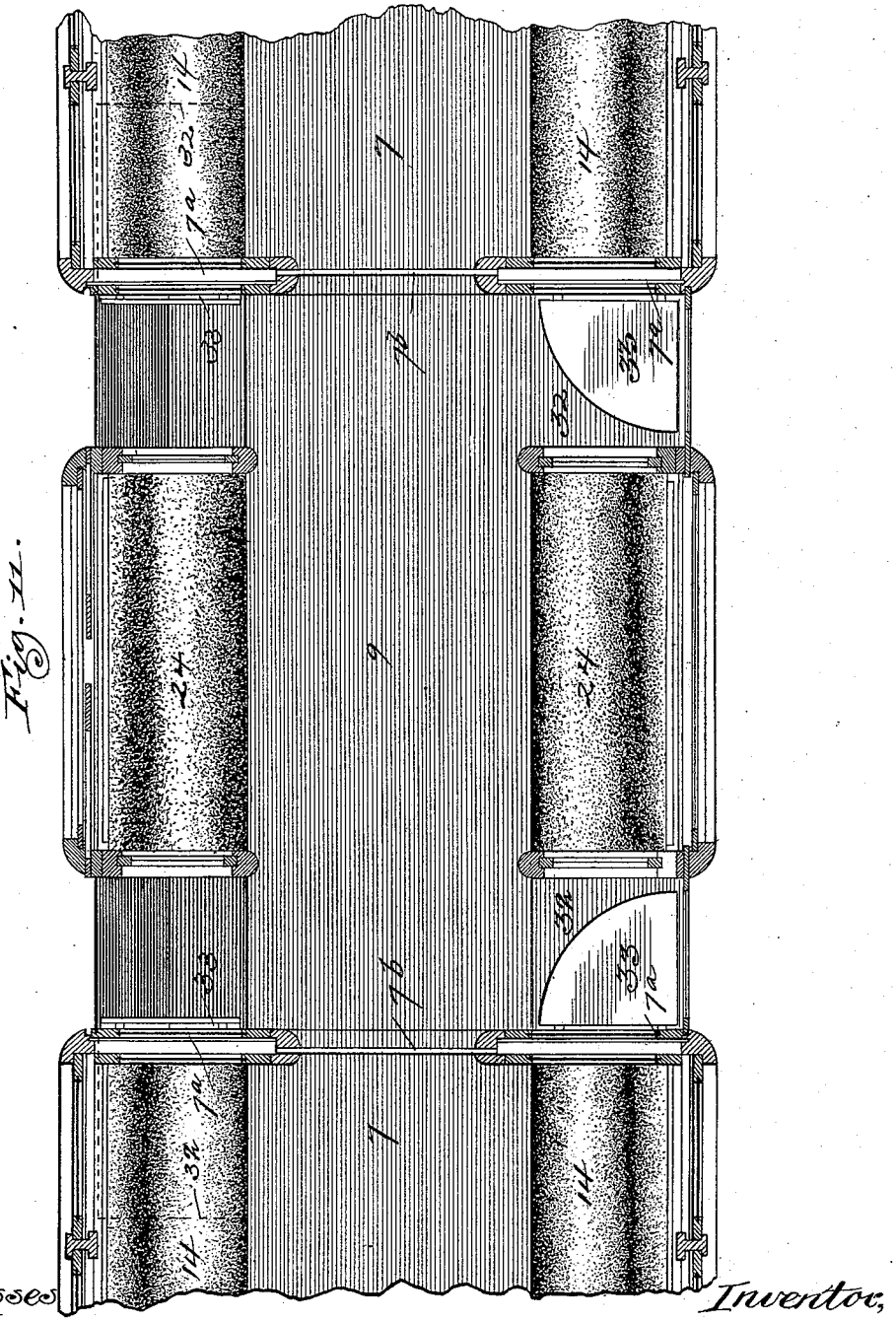

UNITED STATES PATENT OFFICE.

CHARLES L. PULLMAN, OF CHICAGO, ILLINOIS.

PASSENGER-CAR.

SPECIFICATION forming part of Letters Patent No. 471,761, dated March 29, 1892.

Application filed July 28, 1891. Serial No. 400,993. (No model.)

*To all whom it may concern:*

Be it known that I, CHARLES L. PULLMAN, a citizen of the United States, residing at Chicago, Illinois, have invented certain new and useful Improvements in Passenger-Cars, of which the following is a specification.

The object of my invention is to improve the construction of passenger-cars, and particularly those employed upon surface or elevated street-railroads, so as to increase their seating capacity without increasing their size; to facilitate the operation of such cars; to improve the means of entrance and exit to the car and assure the safety and convenience of the passengers thereby; to provide a convenient station for the conductor and driver or operator of the car, and to improve other of the structural features and arrangement of parts, as hereinafter described.

My invention is adapted to be employed with the ordinary surface or elevated street-railway car having inside seats only or with cars now just coming into use, which have seats both inside and outside the car.

A feature of my invention relates to providing these double-deck cars with easy and safe means of entrance and exit to the upper or outside seats. In all surface and elevated passenger-cars which have heretofore been in practical use in cities and for suburban traffic a platform is provided at each end of the car, and usually both front and rear platforms have steps leading therefrom for the use of passengers in entering and alighting from the car. The driver of the car is usually stationed upon the front platform, while the conductor is stationed on the rear platform, and the passengers are usually permitted to enter or alight from either platform. The conductor is thus obliged to watch the movements of passengers at each end of the car, and when passengers alight or enter from or by the front platform they are in close proximity to the forward wheels of the car, and frequently accidents are caused by the passenger missing his footing and falling beneath the wheels. I obviate these and other objectionable features in the construction of street-railway cars by dispensing with the end platforms and dividing the car transversely below the deck-line into two compartments, each occupying one end of the car and communicating with each other by a central vestibule provided with side entrances, through which the passengers enter and leave the car near its middle instead of at its ends, as in the previous construction. This vestibule is covered partially or wholly, according as the car is double or single decked, and its floor is formed by the car-floor. Its sides may be partially closed by central panels, and I prefer to provide sliding doors on both sides of the car and on each side of the panels and steps leading from each of the doors. The vestibule may be separated from the end compartments by transverse partitions having sliding doors. The car is thus practically divided into several compartments—viz., a central vestibule partially or wholly inclosed and provided usually with seats and adapted for smoking-room, a seating-compartment at each end of the car opening off the vestibule and preferably separable therefrom, and a roof-compartment with seats so arranged as to utilize all the available space without interfering with the comfort of the passengers or subjecting them to inconveniences. The conductor's position is in the vestibule, and enables him to oversee all the passengers and to rapidly collect the fares, while a special cab is provided for the driver at an elevation and apart from the passengers, so that he is in the best position to control his car.

A meritorious feature of my invention relates to the provision of stairways leading to the roof-seats. These stairways in the preferred construction are two in number, each located substantially in the plane of the sides of the car, and each stairway being located centrally of the length of the vestibule and having common steps at the bottom and branching toward their tops into two flights, which flights land the passengers facing toward the ends of the car and at four points upon the roof, so that four passengers may enter or leave the stairways at the same time. There are thus provided two separated or divided central entrances upon each side of the car, and the car may be thus rapidly filled or unloaded without confusion or delay.

Figure 2:
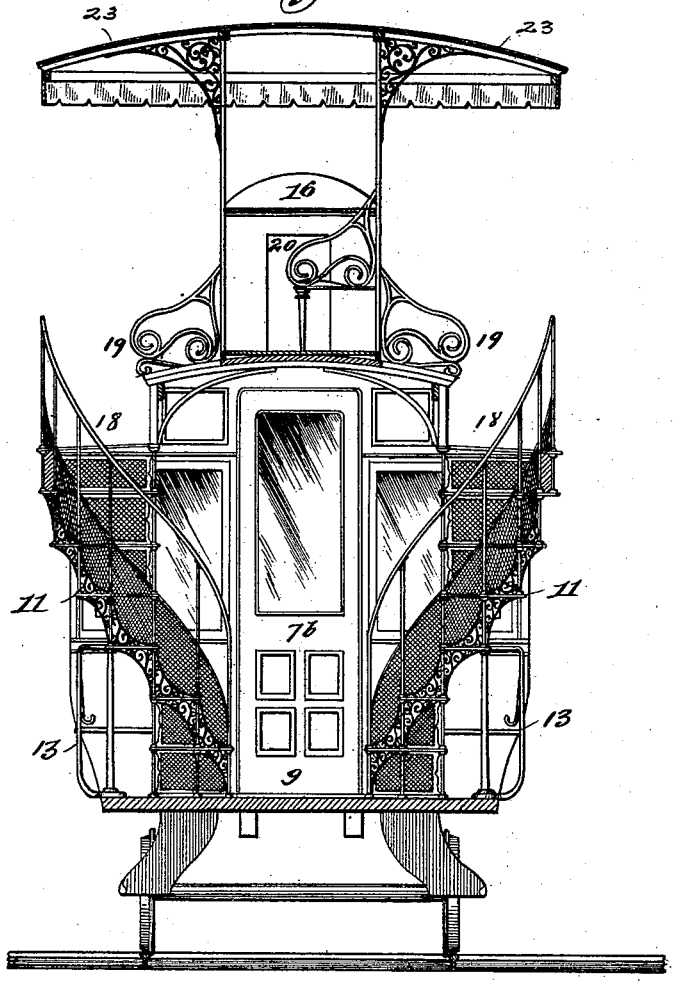
Figure 3:
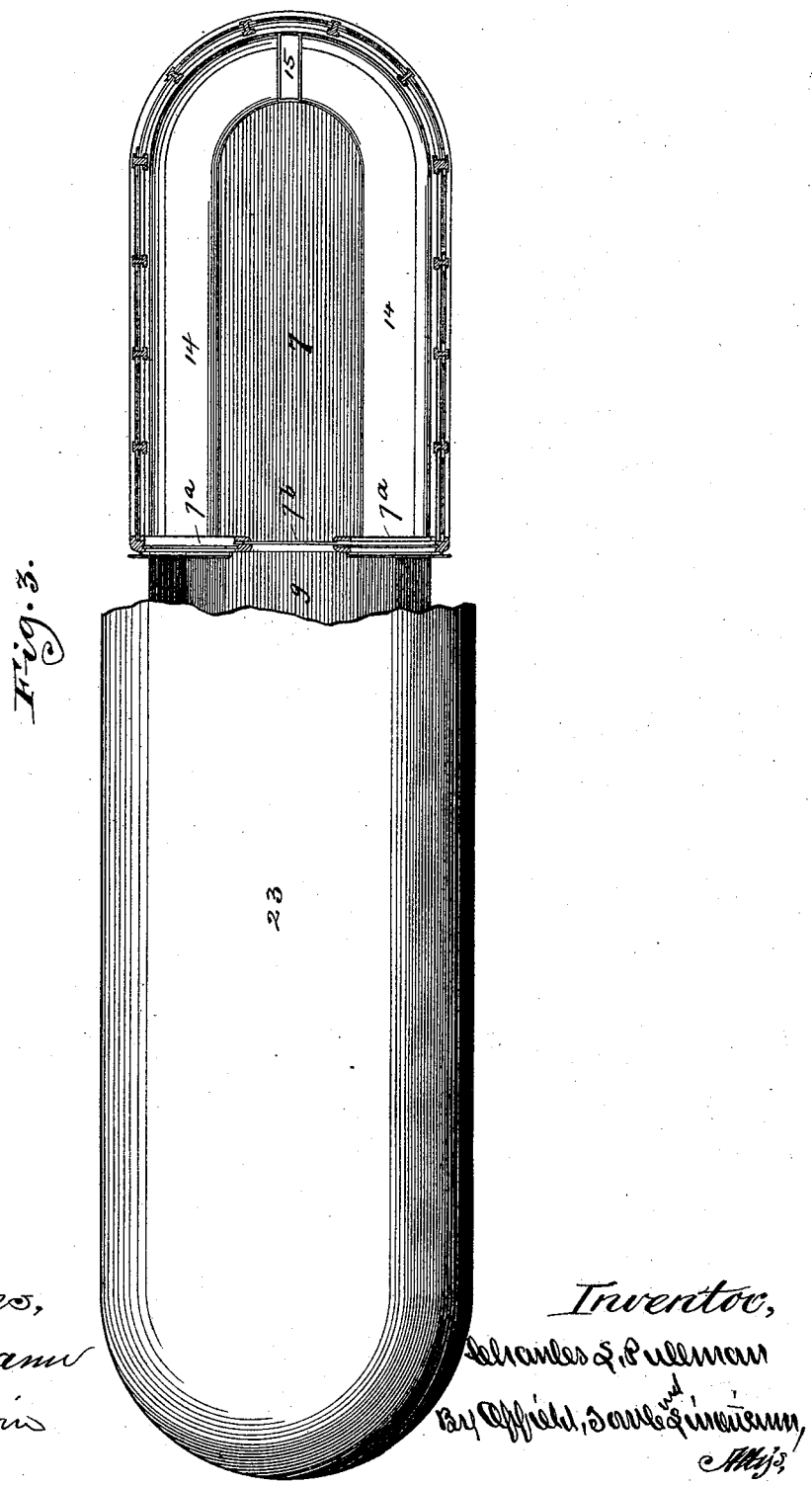
Figure 4:
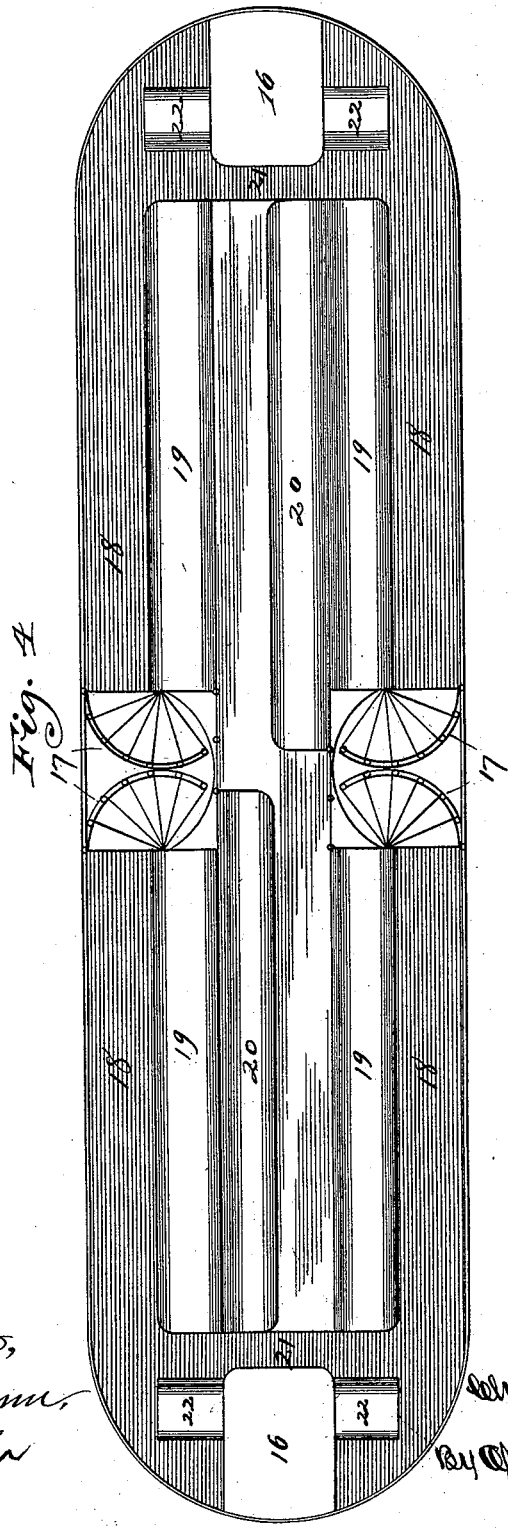

In the accompanying drawings, Figure 1 is a side elevation of a car having roof-seats, a driver's cab at either end, and a canopy. Fig. 2 is a transverse sectional elevation on line 2 2 of Fig. 1, looking in the direction indicated by the arrow. Fig. 3 is a plan view with part of the canopy-roof broken away to show the arrangement of the seats upon the interior of one of the closed sections of the car. Fig. 4 is a plan view of the arrangement of the roof-seats, the canopy being removed. Fig. 5 is a side elevation of a car provided with a central open vestibule, the upper seats being omitted. Fig. 6 is a horizontal sectional plan view showing the arrangement of the seats of the car shown in Fig. 5. Fig. 7 is a perspective view of a combined platform and seat. Fig. 8 is a broken elevation of the double-deck car at the vestibule, showing a modified construction of the stairs and showing, also, safety-gates and other details of novel construction. Fig. 9 is a sectional plan view of the same. Fig. 10 is a broken elevation of a single-deck car at the vestibule and showing the latter inclosed; and Fig. 11 is a sectional plan thereof, showing the arrangement of the seats within the vestibule and compartments.

The body of the car is divided transversely into two end sections or compartments 7. The roof 8 extends over these compartments and with the floor 9 forms a central passage or vestibule between the compartments. Entrance to the vestibule is afforded by steps 11, preferably divided into two flights at each side of the car and provided with handrails 13.

The corners of the car are preferably rounded, as clearly shown in the drawings, and the usual end platforms are entirely dispensed with, the space heretofore occupied by such platforms being inclosed by the roof and side walls.

The interior arrangement of seats within the compartments 7 may be considerably varied; but, as shown in the drawings, Figs. 3 and 6, I have provided each of said compartments with seats 14, extended along the sides and around the ends of the car, except that in one section I have made provision by means of the inclosed space 15 for carrying the operating levers or cords to the driver's cab 16, which is preferably stationed on the roof at the extreme end of the car and brought down as low as possible without interfering with the light or the head-room inside the car. The inner ends of the compartments 7 may be closed by the transverse stationary walls 7ᵃ and the sliding doors 7ᵇ.

Where the car is provided with roof-seats, I employ the winding stairways 17, which may be arranged in two pairs, as clearly shown in Figs. 1 and 4, or which may consist of long steps at the base divided into two flights leading to the respective ends of the car, as clearly shown in Figs. 8 and 9. These stairways are approached from the floor of the vestibule, and they land near the outer sides of the roof and facing in the direction of its length—that is, at the ends of the passages 18, respectively. Adjacent to these passages are the top seats 19, arranged, preferably, longitudinally of the car and facing outwardly. The passages 18 afford foot-room for persons occupying the seats 19, and as the backs of the seats 19 are some distance apart I utilize the space between them by providing therein two additional seats 20 over the respective ends of the car, and which may be approached from the transverse passages 21, connecting the passages 18. I also provide at each side of the driver's cab the seats 22, which may face front and rear, respectively. In this way the entire roof is utilized for seats, passages, and footways, except the space occupied by the driver's cab and stairways. I have shown a canopy 23 to shelter the outside passengers from the sun and inclement weather. While this construction, wherein a central platform is employed, is particularly well adapted to cars having top or roof seats, because of the additional security it affords to passengers in entering and leaving the car, this feature of the invention may be employed also in a car such as shown in Figs. 5, 6, 10, and 11, wherein the roof-seats are omitted. The vestibule in this case may be shorter—that is to say, the inclosed sections of the car may be closer together, since the stairways in this case are omitted; but, as shown in the drawings, the vestibule is of the same length as in the car having the roof-seats and stairways, and in order to obviate any loss of space this platform is flanked at each side with the seats 24 and may be used as a smoking-room.

The best managed city passenger-railroads at the present time provide against the passengers entering indiscriminately from both sides of the car or train of cars by putting up gates or other barriers across the entrances which it is desired shall not be used. I have shown in Figs. 5 and 6 gates 25 of ordinary construction, which will be adapted to be removed bodily and shifted from one side of the car to the other, so as to close up the entrance upon one side or the other, as desired. I have also shown movable platforms 26, to which are affixed the seats 27, and these platforms may be bodily removed from one side of the car to the other, so as to cover the steps. One of these combined platforms and seats is shown in Fig. 7. While these gates of ordinary construction and seats of the form shown in Fig. 5 may be employed, I prefer to use the improved gates, sliding platforms, and folding seats shown in Figs. 8 and 9. The preferred form of gate is marked 28 and is of the well-known lazy-tongs form. As shown in Fig. 8, these gates have a double office: first, in their closed positions they each provide one of the grab-handles, while their body structures are concealed in recesses provided for that purpose back of the central panel 29 between the entrances to the vestibule; second, when the gates are extended they form a barrier to close the side entrances of the car upon the side not in use. These gates are made of strips of metal pivotally secured to each other and to an upper and a lower rail. The lower rail is pivotally secured in an opening in the car structure near the floor-line and is designed to swing upon its pivot from a vertical to a horizontal position, or vice versa. The upper rail, when extended in its horizontal position, can be raised until its ends engage suitable catches 30, provided on each side of the entrances to the vestibule, thus extending the intermediate lattice-work between the upper and lower rails. The grab-handle 31 is secured to the lower rail, and when the gate is not in use the upper rail is released from its fastenings and the gate structure folded and the rails swung into their vertical position, as shown by the dotted lines of Fig. 8, thus concealing the folded gate in its recess. The lower rail of the gate when in its vertical position is locked by any suitable means, thus closing the opening of the recess for the gate and leaving only the grab-handle extended therefrom and in its proper position for use.

Sliding platforms 32, Fig. 9, when in use cover the steps of the car on the side opposite the entrances, and when not in use slide back into the car beneath the seats, as shown by the dotted lines. Folding or drop seats 33 are secured to the partitions 7ª and fold up against the partitions when not in use. These folding seats may be provided with backs and extend so as to take the place of the gate or barrier.

Numerous advantages are secured by the construction and arrangement above described. The additional security to passengers is of course of first importance; but incidental to this are the advantages of bringing all the passengers, either entering or leaving the car, directly under the eye of the conductor or other attendant, whose station will be upon the platform 9, where he may observe whether the persons attempting to enter or leave the car are in a safe position before giving the signal to start. His central position also enables him to collect the fares as the passengers enter the car, or fare-boxes may be placed upon the central platform and an attendant stationed there to see that those entering either of the sections or remaining upon the platform deposit fare. The central entrance and exit also give the passenger the additional protection of the length of the car while reaching the nearest adjacent sidewalk from such exit.

The arrangement of the stairways at the center of the car instead of at the ends has obvious advantages. In this way the passengers ascend from or descend upon a wide platform at the middle of the car at some distance from the wheels and under the eye of an attendant stationed upon the platform. The stairways are also much less unsightly when placed at the middle than at the ends of the car, and of course the dispensing with the end platform and the utilization of the space heretofore occupied by them for seating-space not only increases the seating-capacity of the car, but at the same time it affords the passengers in either of the sections an unobstructed view through the end of such section.

It is obvious that many of the structural features which have been herein described may be somewhat modified and that some may be dispensed with in a car where others are employed. I do not limit my invention, therefore, to the precise details of construction nor combination of parts described.

I claim—

1. A street-car divided transversely into two compartments and a central vestibule between them reached by a divided entrance on one or both sides of the car.

2. A street-car divided transversely below the roof-line into two compartments, a central passage or vestibule between said compartments, and a stairway or stairways rising from the floor of said vestibule midway between its ends and providing separated or divided entrances on one or both sides of the car.

3. A street-railway car divided transversely below the roof-line into two seating-compartments, a vestibule or passage between said compartments, divided entrances from both sides of the car leading to said vestibule, and seats located within the vestibule between said entrances.

4. A street-railway car having a central vestibule with separated entrances from one or both sides of the car to such vestibule, seating-compartments in the ends of the car communicating with the vestibule, and folding seats arranged in the vestibule at the entrances.

5. A street-railway car having a central vestibule, divided entrances through the side walls to such vestibule, seating-compartments in the ends of the car communicating with the vestibule, and a continuous roof structure covering the compartments and all or a portion of the vestibule, substantially as described.

6. In a street-railway car, the combination, with a central vestibule, of seating-compartments on opposite sides thereof and divided therefrom by transverse partitions, doors in said partitions, and divided entrances to said vestibule, substantially as described.

7. A street-railway car having seating-compartments in its ends below the roof, a central vestibule or passage between said compartments, outside seats, and two stairways rising from the platform of the vestibule on opposite sides of the longitudinal center thereof, said stairways being divided at or about the middle of their height into diverging flights, substantially as described.

8. A street-car divided transversely below the roof into two separate compartments by a central vestibule or passage, divided entrances in the sides of the car, steps leading to the vestibule through said divided entrances, and sliding doors adapted to close said divided entrances, substantially as described.

9. A street-car divided transversely below the roof into two separate compartments by a central vestibule or passage, openings in the sides of the car, steps leading to the vestibule, and folding seats adjacent to the openings and adapted to be lowered across them, substantially as described.

10. A street-railway car divided transversely into two compartments occupying the ends of the car, a vestibule or passage from which access is had to said compartments, divided entrances through one or both sides of the car to said vestibule, seats arranged longitudinally upon the roof and facing outwardly with passages along the margins of the roof and providing foot-room for the roof-seats, and stairways leading from the vestibule and landing at the ends of said passages, substantially as described.

11. A street-railway car having a central vestibule or passage, entrances through the side walls of the car, seating-compartments communicating with said passage, and a cab for the driver located at the extreme end of the car and having its floor depressed below the roof-line and above the head-space for passengers seated within the compartment, substantially as described.

12. The combination, with the entrance-platform of a passenger-car, of a collapsible gate pivoted at one side of the entrance and adapted to be extended whereby to form a barrier and to be turned on its pivot, whereby it may be moved out of way, substantially as described.

13. A car having a central vestibule or passage, seating-compartments occupying the ends of the car and communicating with said passage, roof-seats, stairways leading from the vestibule to said roof-seats, and an elevated cab for the driver located at the end of the car and accessible through said vestibule and stairways.

14. The combination, with a car-platform having entrance-steps at each end thereof, of a movable seat adapted when in use to cover the steps, and a gate adapted to bar the entrance and to provide a back for said seat, substantially as described.

15. The combination, with a car-platform having steps leading from each end thereof, of sliding platforms adapted to cover said steps, and folding seats adapted to be let down over said platforms, substantially as described.

CHARLES L. PULLMAN.

Witnesses:
H. S. TOWLE,
C. C. LINTHICUM.